United States Patent [19]
Arciprete et al.

[11] 3,717,875
[45] Feb. 20, 1973

[54] METHOD AND APPARATUS FOR DIRECTING THE FLOW OF LIQUID DROPLETS IN A STREAM AND INSTRUMENTS INCORPORATING THE SAME

[75] Inventors: Genio R. Arciprete, Lexington; Walter J. Cairns, Marblehead, both of Mass.; Carl Hellmuth Hertz, Lund; Jell Ake Gosta Mansson, Genarp, both of Sweden; John L. Rothery, Marblehead, Mass.

[73] Assignee: Arthur D. Little, Inc., Cambridge, Mass.

[22] Filed: May 4, 1971

[21] Appl. No.: 140,145

[52] U.S. Cl. ......................... 346/1, 239/4, 239/102, 346/75
[51] Int. Cl. ............................................. G01d 15/18
[58] Field of Search ................. 346/75, 1; 239/4, 102

[56] References Cited

UNITED STATES PATENTS

| | | | |
|---|---|---|---|
| 2,566,443 | 9/1951 | Elmquist | 346/75 |
| 3,416,153 | 12/1968 | Hertz et al. | 346/75 |
| 3,596,275 | 7/1971 | Sweet | 346/75 X |

*Primary Examiner*—Joseph W. Hartary
*Attorney*—Bessie A. Lepper

[57] ABSTRACT

Method and apparatus for effecting the divergence of liquid droplets formed from a liquid stream ejected under pressure through a small-diameter nozzle. By imparting to the stream periodic mechanical oscillations within a predetermined frequency range, the droplets are caused to split into two or more separate and distinct streams which diverge angularly from the normal axis of the droplet stream. Those droplets in the stream travelling along the normal axis are separated from those travelling in the diverged streams thus providing a means for accurately measuring extremely small quantities of liquid delivered to a desired collection point. The method and apparatus are particularly suited for ink jet recording as well as for metering out small amounts of a liquid.

41 Claims, 16 Drawing Figures

Genio R. Arciprete
Walter J. Cairns
Carl Hellmuth Hertz
Kjell Åke Gösta Månsson
John L. Rothery
*INVENTORS*

BY *Burie A. Lyypur*
Attorney

METHOD AND APPARATUS FOR DIRECTING THE FLOW OF LIQUID DROPLETS IN A STREAM AND INSTRUMENTS INCORPORATING THE SAME

This invention relates to method and apparatus for directing the flow of liquid under pressure in the form of a stream of droplets and more particularly for delivering controlled amounts of a liquid to a receptor.

In a number of processes it is necessary to be able to deliver a controlled amount of a liquid to a receptor. An important example of such a process is that employed in ink jet recorders where a stream of liquid ink droplets is subjected to an electrical or magnetic field, the intensity of which is controlled to control the amount and location of ink reaching a paper surface. Another example of such a process is the control of fuel entering the carburetor of an internal combustion engine. In addition to these two specific examples there are many cases in chemical and combustion processes where controlled amounts of liquids must be introduced into a system.

In addition to the prior art which is concerned with the opening and closing of various types of mechanical equipment such as valves and the actuation of electrical equipment such as solenoid switches and the like, there has been built up in this field a body of prior art concerned specifically with the intensity modulation of a recording ink jet. It is this body of prior art which is pertinent to the method and apparatus of this invention. In this prior art, electrical fields and electrical charges on the individual droplets in a liquid jet stream have been used to control the behavior of the droplets and hence to control the arrival or nonarrival of the droplets at a predetermined point of a receptor such as a sheet of paper. Exemplary of some of the more recent patents in this prior art are U.S. Pat. Nos. 2,566,433 and 3,416,153. Alternatively, the ink may contain a magnetic polarizable component and a magnetic field may be used to control the ink flow. (See for example U.S. Pat. No. 3,287,734.)

Although the method and apparatus of this invention will be described primarily in terms of their application to ink-jet recorder systems, it is to be understood that this invention has a wide variety of applications outside the ink-jet recorder field which is taken only as exemplary. In general it may be stated that this invention is applicable to the control of a liquid which can be handled as a stream of individual droplets formed by delivering the liquid under pressure through a small aperture.

In ink-jet recording systems, electrical fields and electrical charges on the individual droplets in the liquid stream have been used to control the amount of divergence of the droplets from the normal axis of the stream and thereby to control the amount of ink which passes through the relatively small opening of an interceptor to strike the paper. In U.S. Pat. No. 3,416,153 the stream of ink droplets passes through a porous control electrode and the amount of ink divergence into the electrode is controlled by the voltage on the electrode. As the voltage on the electrode is increased, the amount of ink diverted from its normal path for removal through the electrode is increased and the amount of ink reaching the paper surface is decreased. With the incorporation of voltage pulse modulation means, or through the utilization of voltage levels less than those required for complete ink deflection, this system can make copy with a gray-scale. Such a system normally requires means for handling and controlling high voltages which in turn involves relatively expensive equipment components. Moreover, the size of the capillary aperture through which the liquid ink is delivered is restricted by such factors as nozzle plugging. In addition, the number of capillaries along with the necessary electrode means that can be placed in a given volume is restricted for physical reasons. It would therefore be desirable to have available for some types of ink-jet recorders an ink droplet control system which offered more flexibility in operational parameters and did not require the use of high voltages. The method and apparatus of this invention achieves these and other desiderata through the use of relatively low intensity mechanical oscillations.

It is therefore a primary object of this invention to provide an improved method of controlling the divergence of liquid droplets in a stream from the normal axis of the stream. It is another primary object to employ this method of control to effect the delivery or nondelivery of liquid droplets to a receptor through an interceptor, that is to switch on and off the flow of liquid droplets reaching a receptor. It is another object to provide a method of the character described which requires the control of relatively low intensity mechanical vibrations, is flexible with reference to operational parameters including jet speed and nozzle diameter, is applicable to a plurality of closely spaced jets separately controlled, and may be made free from the need for switching high voltages.

It is another primary object of this invention to provide an improved apparatus for controlling the direction of flow of liquid droplets in a stream and for switching on and off the flow of liquid droplets to a receptor. An additional object is to provide apparatus of the character described which is simple in construction and operation, capable of operation using transistor circuitry, and flexible with regard to choice and arrangement of components. Other objects of the invention will in part be obvious and will in part be apparent hereinafter.

The method of this invention is characterized by imparting to a liquid, issuing from a small aperture under sufficient pressure to form individual droplets travelling in a jet stream, periodic oscillations, the frequency and amplitude of which are adjusted to cause the droplets to diverge angularly from the normal axis of the jet stream in the form of secondary line-formed jet streams. This is based upon the novel discovery that for an appropriate combination of jet stream velocity and aperture diameter there is a certain frequency band which effects such angular divergence and that the amplitude of the oscillations determines the angle of divergence. By placing upstream from the liquid receptor a suitable interceptor capable of passing either the droplets travelling along the stream axis or those caused to be diverged from the axis, it is possible to control the liquid reaching the receptor. Thus by controlling the mechanical oscillations imposed upon the liquid it is possible to switch on and off the liquid received by the receptor. By combining this on-off switching with proper modulation of pulse duration it is possible to use this method to obtain a gray scale in ink jet recording.

The apparatus of this invention is characterized by including means to impart periodic oscillations of a predetermined frequency and amplitude to the liquid, either in the liquid delivery line or in the liquid stream just before drop formation. Damping means to cause the mechanical oscillations to stop or change their amplitude instantaneously, means to periodically vary the direction of the liquid jet in a plane normal to the jet axis, and means to effect pulse duration modulation may also be included. The apparatus readily lends itself to the combining of a plurality of separately controlled liquid streams in one apparatus such as a jet recorder or typewriter.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

For a fuller understanding of the nature and objects of the invention reference should be had to the following detailed description taken in connection with the accompany drawings in which.

Figure 1:
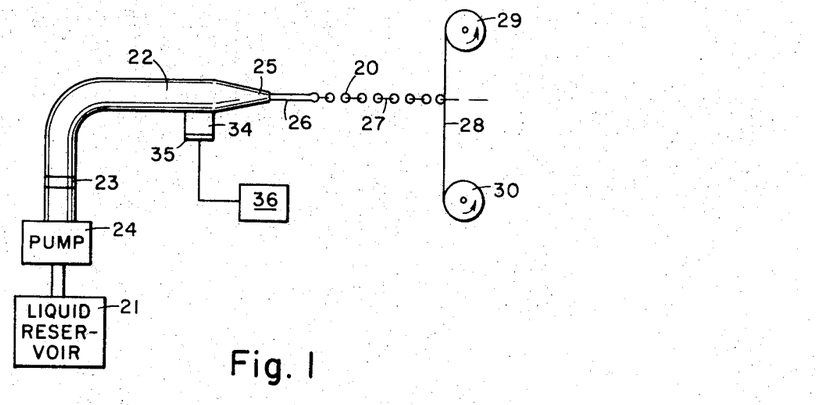
FIG. 1 is a side elevational, somewhat simplified, drawing of an embodiment of the apparatus of this invention.

The basic method of this invention may be explained in detail with references to FIGS. 1–7, using a modified ink jet recorder system as exemplary of the apparatus. FIG. 1 shows a fine liquid jet of droplets 20 which is generated by forcing a liquid from a reservoir 21 through a liquid delivery line 22, containing filter 23, by means of a suitable pump 24. The liquid delivery line terminates in a relatively small-diameter aperture (nozzle) 25. The liquid issues from the nozzle as a straight cylinder 26 with a relatively small diameter. A certain distance from the nozzle 25 the jet breaks up into a sequence of small droplets in a well-known way, and the droplets move directly along the axis 27 of the jet stream to strike a receptor shown as a moving strip of paper 28 being transferred from roller 29 to 30 by means not shown.

It is known that in using the apparatus of FIG. 1, it is possible to transmit periodic mechanical oscillations to the supply line 22 such as by mechanically linking it to a suitable transducer for generating such oscillations. One type of such a transducer is a piezoelectric crystal 34 having an electrode 35 connected in the well-known manner to an electrical oscillator 36. Any other electromechanical transducer can be used as well. However, in prior art apparatus, including ink jet recorders, these periodic oscillations were imposed to enhance droplet formation as well as to improve the uniformity of droplet size. (See for example U.S. Pat. No. 3,287,734 and British Pat. No 1,123,188.) In these prior art methods, as well as those described for example in U.S. Pat. No. 3,416,153, an additional force, e.g., electrostatic, magnetic or the like must be employed to cause selected ones of the droplets in the liquid jet stream to be diverted from travelling along the normal axis of the stream, thus in effect obtaining a write or a no-write condition through the application of a high-voltage.

In accordance with the novel discovery embodied in the method and apparatus of this invention, periodic oscillations applied to the liquid stream, either while it is in the feed line 22 or just after it has emerged from the nozzle 25 and before droplet formation, are used as the sole means for controlling the direction of droplet travel. Thus, by proper choice of oscillation frequency for a given nozzle diameter it is possible to cause the droplets 20 to diverge angularly from the normal axis 27 of the liquid stream. The frequency band at which this divergence takes place for any given nozzle diameter is relatively narrow, of the order of one-half the maximum frequency at which the phenomenon occurs. At frequencies above or below this narrow band, droplet divergence will not occur.

The angle of such droplet divergence is controlled by the amplitude of the periodic oscillations; while the pattern of this droplet divergence may be varied by varying other operational parameters as illustrated by FIGS. 2–6 which are line drawings made from actual photographs of jets taken with a stroboscope synchronized to the mechanical vibrations applied to the liquid stream. In FIGS. 2–6 a water jet was ejected from a glass capillary with an 0.25mm diameter nozzle. The capillary was vibrated transversely to the stream axis at a frequency of 3,000Hz using the apparatus of FIG. 1 with a vibrating reed driven by an AC-supplied electro-magnet instead of the piezoelectric crystal.

Figure 2:
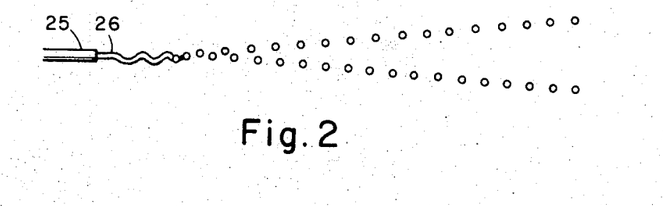
FIGS. 2–6 illustrate patterns of droplet divergence from the normal axis of the stream as operational parameters are varied.
Figure 3:
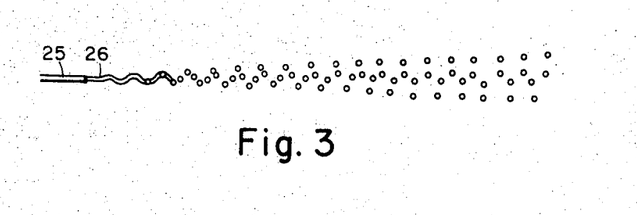

FIG. 2 shows the actual appearance of the physical effect which is used in the method and apparatus of this invention to control the direction of the droplet stream. In FIG. 2 the true splitting of the liquid jet into two separate and distinct streams of droplets is shown. This splitting is due to the oscillations applied to the stream prior to its leaving the nozzle. In FIG. 2 the 0.25mm diameter nozzle had oscillations of a frequency of about 3,000Hz and of an amplitude of about 0.05mm, or a little less, applied to it. The jet speed was about 3 meters per second. In FIG. 2, which shows the typical appearance of the effect, the small oscillations of the nozzle cause transverse waves of appreciable amplitude on the continuous part of the liquid jet stream between the nozzle and the point of drop formation. After breaking up into separate droplets, the transverse energy of these waves causes the drops to travel in two directions and thus to diverge from the normal axis of the undisturbed jet. It may be noted that under these conditions no actual motion of the nozzle was observed.

Figure 4:
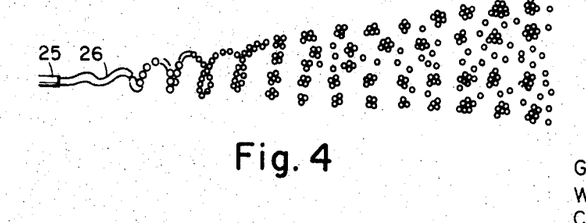
Figure 5:
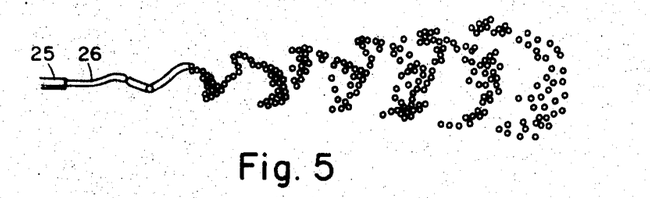

The basic pattern of droplet divergence shown in FIG. 2 may be changed by changing the fluid pressure to change the jet speed and by varying the oscillation amplitude. Thus by increasing the fluid pressure (i.e., increasing the jet speed) as well as the vibration amplitude, there may result the divergence pattern illustrated in FIG. 3 where four separate secondary jets are generated, all of the jets diverging from the original direction of the normal axis of the undisturbed jet at different angles. Under certain conditions even more than four separate diverging secondary jets of liquid can be observed. In FIG. 4, it will be seen that a further increase of the jet speed and oscillation amplitude over that used in FIG. 3 so transforms the appearance of the divergence pattern that the number of secondary diverging jets has become so large that they cannot be easily distinguished. Finally, FIG. 5 shows the appearance of the jet if the jet velocity is increased even further, for it is converted into a fan-like spray of droplets.

Figure 6:
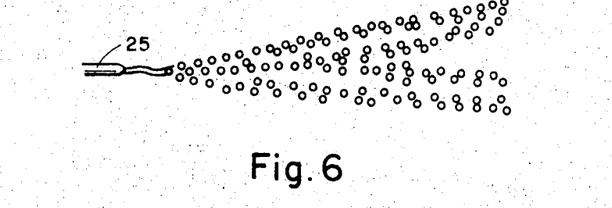

From FIGS. 2–5 it will be obvious that other forms of liquid droplet divergence patterns can be obtained depending upon the vibration amplitudes, jet velocities and nozzle diameters chosen. In particular, an increase in the amplitude of the mechanical oscillations applied will result in the generation of more and more secondary jets until the diverged droplets finally form a pattern approaching or essentially equivalent to a spray as shown in FIG. 6. Hence, by control of the mechanical oscillations the liquid jet can be changed from a single jet into two or more diverging jets. Laboratory observations indicate that the same phenomenon can be obtained using longitudinal rather than transverse mechanical oscillations of the nozzle.

The mechanism by which the periodic oscillations applied to the stream prior to droplet formulation cause the divergence of the droplets into two or more distinct streams, the point of intersection of which lies in front of the nozzle, is not completely understood. It does, however, seem that since longitudinal as well as transverse mechanical oscillations can be applied to the nozzle to obtain the desired droplet divergence it may not be brought about through any actual motion of the nozzle. In many instances it has not been possible to detect such motion.

Figure 16:
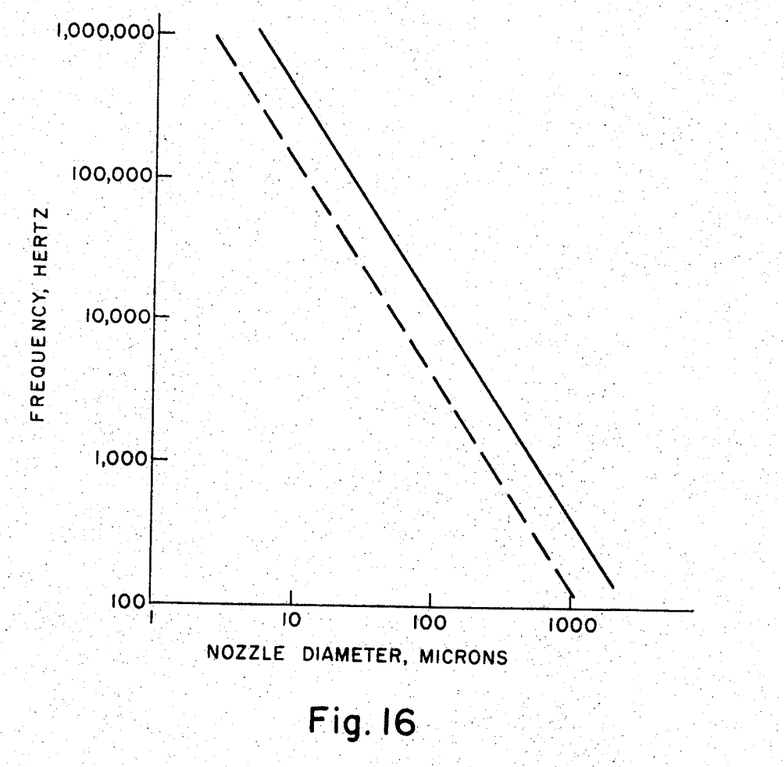
FIG. 16 are plots of the approximate relationship between nozzle diameter and oscillation frequency required to obtain divergence of the liquid droplets from the normal stream axis as well as the maximum on-off intensity modulation frequency that can be obtained by this method.

The oscillation frequency at which this phenomenon occurs is a function of the nozzle diameter as shown in the log-log plot of FIG. 16 wherein the dotted lower line is a plot of the frequency which can be used for on-off intensity modulation for a given nozzle diameter of the liquid jet, i.e., required to switch from normal to the split jet condition; and the solid line is a plot of the maximum frequency for a given nozzle diameter required to obtain effective droplet divergence or stream splitting, i.e., above which divergence is not observed. The data from which the lines of FIG. 16 were plotted were obtained using water as the liquid. The actual form of the plot is dependent upon such fluid parameters as viscosity, surface tension, density, etc., and hence upon the fluid used.

Figure 7:
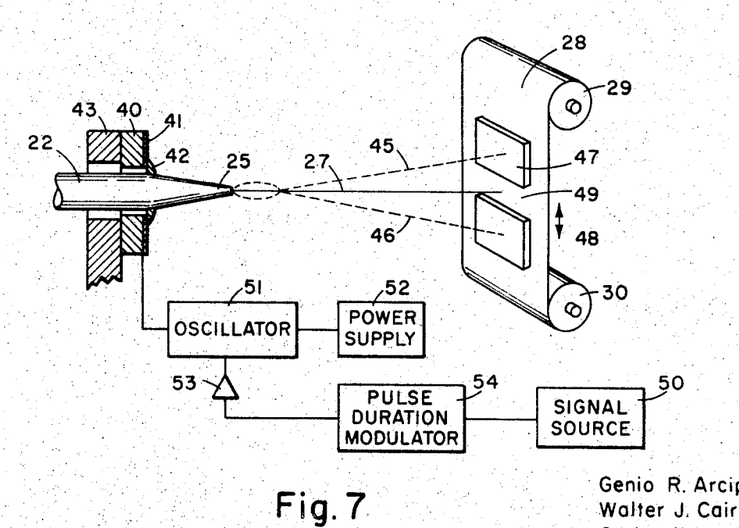
FIG. 7 illustrates one embodiment of the method and apparatus of this invention applied to ink jet recording.

In the simplest form of the apparatus illustrated in FIG. 1 the piezoelectric crystal is used to generate transverse mechanical oscillations and the signals are such as to cause the oscillator to oscillate at the desired frequency or not to oscillate. However, longitudinal, or a combination of transverse and longitudinal oscillations may be used and the fixed frequency oscillator may be replaced by a variable frequency oscillator. In the apparatus of FIG. 7, which illustrates in a basic way the application of the method and apparatus of this invention to an ink jet recording system, a combination of these two modes of oscillation is illustrated and means for obtaining gray scales are added. In FIG. 7, like components are identified by like reference numerals of FIG. 1. A piezoelectric crystal 40 and its associated electrode 41 are mounted around the feed line 22 and permanently adhered to it through a suitable adhesive 42 such as an epoxy resin. A piezoelectric crystal of this form and mounted in this manner imposes both transverse and longitudinal oscillations to the inlet line and hence to liquid flowing therein. To obtain a high upper frequency limit of modulation it is important that the mechanical oscillations cease instantaneously when the electrical signal becomes zero. To obtain this, the mechanical oscillations of the crystal must be damped. One means for this damping is illustrated in FIG. 7. It is the crystal mounting member 43 which is formed of a sound absorbing material such as a mixture of tungsten powder and araldite. It is, of course, necessary to form a good mechanical contact between crystal 40 and mounting member 43.

Figure 10:
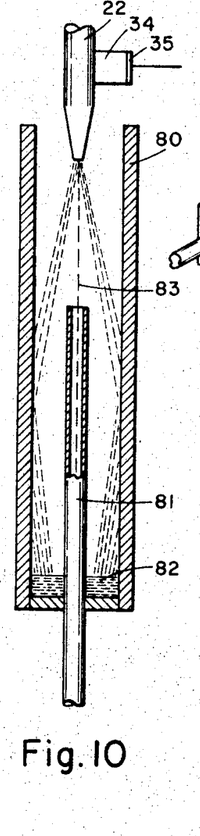
FIG. 10 is a cross sectional simplified drawing of an apparatus constructed in accordance with this invention and adapted to meter accurately controlled amounts of a liquid.

In the basic concept of an ink jet recorder constructed in accordance with this invention, it is necessary to prevent those ink droplets which have been dispersed by reason of their having been caused to diverge from the normal stream axis from reaching the paper 28. This is done by placing an intercepting means between the nozzle and the recording paper in such a way that the diverted droplets, shown for convenience as secondary jets 45 and 46, are intercepted. This may be done by placing porous plates 47 and 48 between the nozzle and the paper surface. These plates define between them a relatively narrow aperture 49 through which droplets travelling along the normal stream axis may pass to contact the paper. As will be described below in detail, the liquid striking porous plates 47 and 48, or other suitably configured members, may be removed by suction and returned to the liquid supply. Alternatively the aperture 49 can be part of a structure designed so that the intercepted liquid may be removed by gravity as illustrated in FIG. 10.

The source 50 of signals, which may be optically electrically generated from a master to be copied, or electrically generated by pressing the key of a typewriter or by any other suitable manner, is transmitted to the oscillator 51. This oscillator 51 generates the AC-signal which causes the mechanical vibrations by way of transducer 40 which are necessary to produce the splitting of the jet and the divergence of the droplet streams. To control the extent of such divergence of the droplets and the formation of secondary jets (as illustrated in FIGS. 2–6) the amplitude of the signal from oscillator 51 or its frequency can be changed by the signal from signal source 50. In both cases the vibration amplitude of the transducer 40 is changed, thus affecting the divergence pattern of the secondary jets. It is also possible to shift the frequency of the oscillator to a frequency which will not cause droplet divergence, i.e., to a frequency either greater or less than the droplet divergence oscillator frequency. Associated with this oscillator are a power supply 52 and a signal amplifier 53. Between the signal source 50 and the oscillator 51 there may be interposed a pulse duration modulator 54, the purpose of which is to make possible the attainment of a gray scale. The use of a pulse duration modulator for this purpose is known.

In the operation of the apparatus of FIG. 7, the signal source must be of a character to cause the amplitude or frequency shift of the oscillator to change to the non-recording mode, i.e., that mode of operation which will cause droplet divergence from the normal stream axis 27 when no ink is to reach the paper surface. During those periods of operation when the oscillator is changed to the recording mode, the pulse duration modulator controls the length of time over the duration of any one pulse that ink is delivered to the paper.

In an alternative embodiment, it is possible to reverse the operation of the device of FIG. 7 in that the ink jet along the normal stream axis 27 is intercepted and, when it is desired to have ink reach the paper surface, the jet is split into a pair of diverging streams, one or both of which is or are employed as the "writing" stream.

Figure 8:
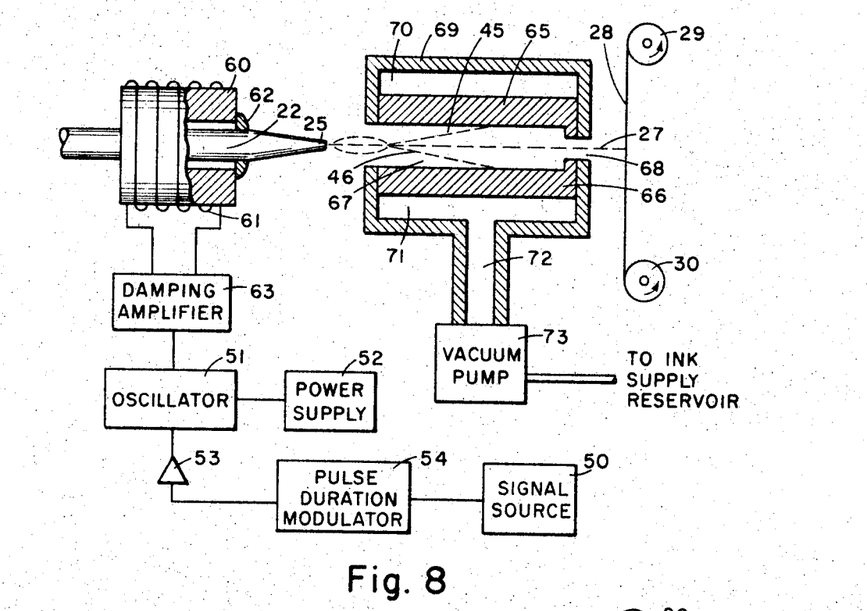
FIG. 8 is a cross sectional illustration of another embodiment of the apparatus of this invention applied to ink jet recording.

The apparatus of FIG. 8 illustrates a specific embodiment of the interceptor means, another way in which the required mechanical oscillations may be attained, and a another form of damping means. Like reference numerals are used to refer to like components, in FIG. 7. A magnetostrictive means, e.g., a nickel magnetostricitve transducer 60, about which a coil 61 is wound, is mechanically linked to feed line 22 through an adhesive 62 and serves as the means to provide the required mechanical oscillations. A damping amplifier 63 is included to damp the magnetrostrictive transducer.

The interceptor In the apparatus of FIG. 8 takes the form of two porous plates 65 and 66 defining between them a passage 67 and being inwardly flanged at the delivery end to form a relatively narrow aperture 68. The porous plates are surrounded by a vacuum-tight housing 69 arranged to provide passages, e.g., 70 and 71, through which the ink, removed by suction through plates 65 and 66, may be withdrawn by way of conduit 72 and suction pump 73 for return to the ink supply reservoir. Since porous plates 65 and 66 do not have to serve as electrodes they may be spaced as closely as desired without danger of arcing, and they may be configured to meet design requirements for a wide variety of instrument modifications and adaptations.

Moreover, the means defining the passage 67 may be positioned close enough to the nozzle 25 to protect it and the liquid stream from air currents or other physical disturbances.

Figure 9:
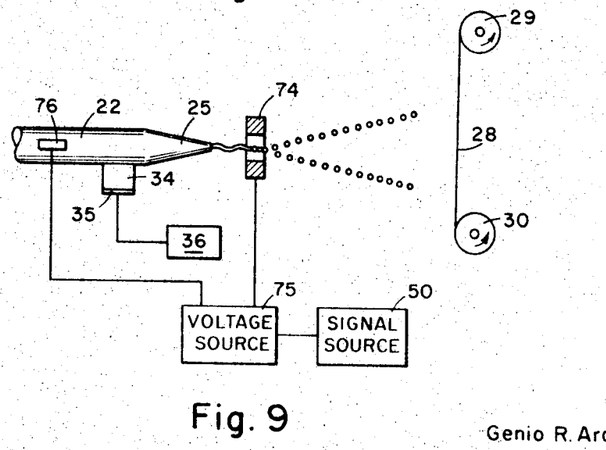
FIG. 9 is a modification of the apparatus of FIG. 1 including an electrode positioned near the point of drop formation to enhance separation of droplet streams.

Although an electrode such as that disclosed in U.S. Pat. No. 3,416,153, is not required it may, in some instances, be desirable to position an electrode at or near the point of droplet formation to establish an electric field to provide a supplementary influence on droplet divergence. Thus in a modification of FIG. 1 as shown in FIG. 9, an annular control electrode 74 is placed in front of nozzle 25 near the point of droplet formation and is connected to one output terminal of a voltage source 75. The other output terminal of the voltage source is connected to the liquid in conduit 22 through an electrode 76 to establish an electric field between electrode 76 and the point of drop formation. This field generates electrical charges on the continuous part of the jet, as well as on the drops, which partly oppose the surface tension of the fluid in the jet and partly generate forces between the droplets due to electrical repulsion. Both effects tend to influence the mechanism of the splitting phenomenon. For example a voltage of about 1,000 volts, using suitable parameters of jet speed and vibration amplitude as discussed above, can be used to increase the angle between two diverging jets.

FIG. 10 illustrates in simplified form the use of the apparatus for rapidly and accurately controlling the amount of a liquid delivered to a predetermined location such as a chemical or combustion process, e.g., for use in a carburetor of an internal combustion engine. The liquid feed line with its transducer (piezoelectric crystal 34 and electrode 35) may be positioned in any desired orientation. In the apparatus of FIG. 10, a primary housing 80 is designed to receive the liquid delivered when the transducer operates at a frequency to cause divergence of the droplets from the normal stream axis. A small diameter tubing 81 extends into housing 80 and is axially aligned with the normal jet stream. That liquid 82 accumulated by gravity in housing 80 or that which is carried as droplets in a stream 83 by way of tubing 81 to a desired delivery point may constitute the liquid to be measured out. The apparatus of FIG. 10, using a suitably sized nozzle, can deliver accurately measured quantities of fluid. Thus where the fluid is delivered through tubing 81 directly to a point of use, quantities as small as 1/100 $\mu g$ can be measured out. This is based upon the fact that the volume of the drops in jets can be as small as $10^{-6}$ $\mu l$ and switching can be accomplished as fast as 10 $\mu sec$.

Figure 11:
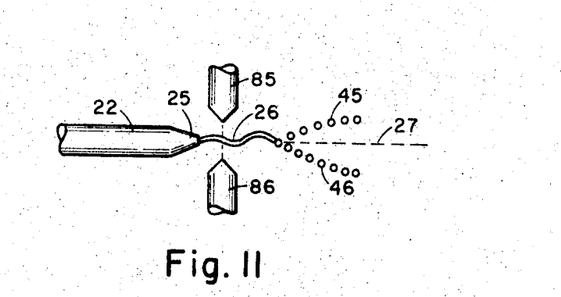
FIG. 11 illustrates in simplified form the use of gas jets to impart the required periodic oscillations to the liquid stream.

FIG. 11 illustrates another means for inducing an oscillatory motion of the ink jet transversely to its axis to split up the ink jet into two or more diverging streams. This embodies the use of one or more fine air streams provided from nozzles 85 and 86 directed substantially perpendicularly to the ink jet 26 near the nozzle 25. The vibrations arise by a suitable interaction of the air streams and the jet. In a preferred embodiment, the velocity of the air stream is changed in an oscillatory manner with a frequency suitable to produce oscillations on the ink jet of a frequency so that the splitting of the stream occurs. Such variations in the air stream can, for example, be obtained by the use of fluidistor components. When both air nozzles are used, they should produce oscillating air streams of the same frequency but with a phase difference of 180°. The apparatus of FIG. 11 can be operated in an ink jet recorder, or other instrument, by switching the air stream or streams on and off.

Figure 12:
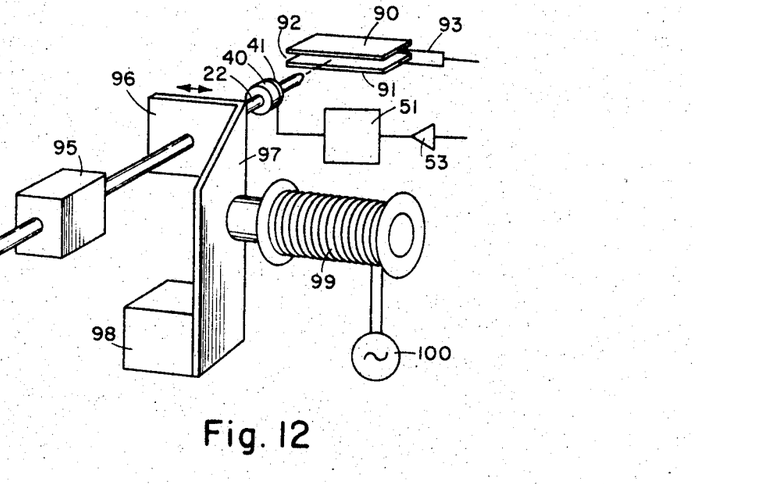
FIG. 12 illustrates the incorporation of means to vary the liquid jet periodically at right angles to the jet in addition to the periodic oscillations required by this invention.
Figure 13:
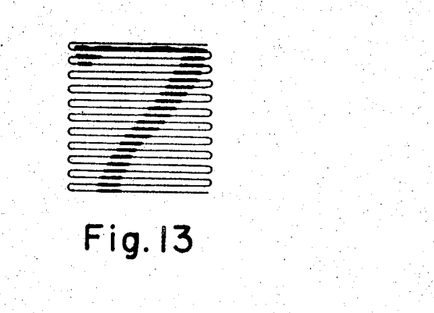
FIG. 13 illustrates an alphanumerical character produced by the apparatus of FIG. 12.

FIG. 12 illustrates another embodiment of the apparatus of this invention designed primarily to print alphanumerical characters of a quality high enough to meet the requirements for typography or other graphic printing techniques. Mechanical oscillations are applied to feed line 22 in the same manner as shown in FIG. 7. Two closely spaced plates 90 and 91, presenting facing porous surfaces to define passage 92 and being sealed to render them nonporous on all other surfaces, are connected to a suction line system 93 which is in fluid communication with a vacuum pump not shown. A capillary tube serving as liquid feed line 22 is fixedly mounted in a holder 95 and extends through an opening in a support plate 96 toward the plates 90 and 91, the axis of the nozzle of line 22 being aligned with the center line of spacing 92. The support plate 96 is secured to a leaf spring 97 which is attached at its other end to a support member 98. An electromagnet 99, through which alternating current flows from an AC source 100, causes the leaf spring 97 to oscillate so that the support plate 96 moves back and forth as illustrated by the arrow. Thus nozzle 25 at the end of feed line 22 will be caused to swing back and forth in a plane at right angles to the direction of motion of a piece of record paper moving as illustrated in FIG. 7. During periods when the apparatus is in its writing mode, the jet of liquid droplets reaching the paper surface will also swing back and forth to provide an approximately sine-shaped recording trace. By suitable selection of the time sequence and type of the signals transmitted to the oscillator 51, optional alphanumerical or other characters can be printed in this manner on a record carrier. An enlarged example of this type of record trace is shown in FIG. 13 wherein the digit seven is reproduced in one operational mode of the apparatus of FIG. 12. It will, of course, be appreciated that only the heavy portions of the sine-shaped recording trace will be visible. It is, of course, within the scope of this invention to use one support plate and one leaf spring for a plurality of capillaires, each of which may have its own transducer associated with it.

Figure 14:
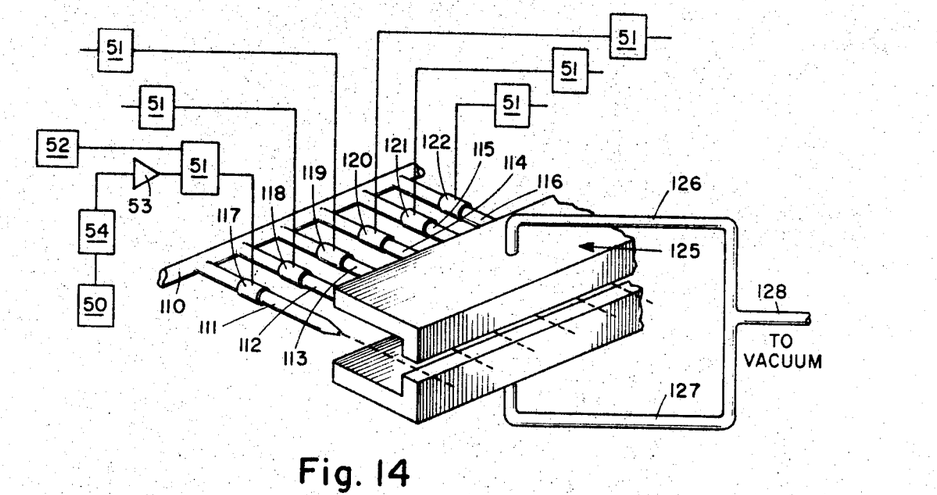
FIGS. 14 and 15 are perspective views of portions of an apparatus, constructed in accordance with this invention, designed to control separately a plurality of liquid jet streams.

FIG. 14 is a fragmentary perspective view of an embodiment of the apparatus of this invention showing the use of a plurality of feed lines and nozzles, each separately controlled, associated with a common interceptor. A manifold 110 provides liquid to a series of feed line 111–116, each of which has associated with it a suitable transducer means 117–122, respectively, in accordance with the teaching of this invention. It is, of course, possible to drive all or any number of the transducers by a single common oscillator. However, in the apparatus shown in FIG. 14 each transducer has its own separate control system as that shown for transducer 117 associated with feed line 111. Similar control systems are not specifically illustrated for transducers 118–122 since they may be made up of the same components as illustrated for transducer 117. The common interceptor 125 may take any suitable form, that illustrated in FIG. 14 being essentially the same as shown in FIG. 8 provided with upper and lower ink draw-off lines 126 and 127 leading to a common line 128 communicating with a vacuum pump not shown. It is also, of course, within the scope of this invention to mount each of the feed lines 111–116 in a common support plate attached to a leaf spring comparable to support plate 96 and leaf spring 97 shown in FIG. 12.

Figure 15:
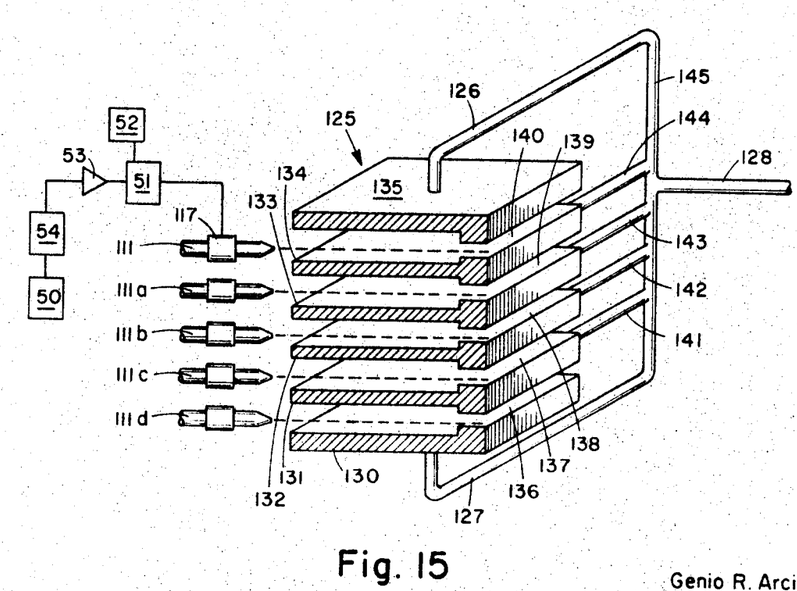

It will be appreciated that in the apparatus of FIG. 14, individual control may be exercised over each of the liquid jet streams without the necessity for providing individual electrodes for each feed line as would be required in such prior art devices which require the use of electrodes to deflect the liquid droplets. This means that the feed lines can be very closely spaced, thereby providing a simple system for locating the maximum member of jet stream-producing means within a given space. The porous plates forming the interceptor may be made quite thin, thus making it also possible to stack rows of feed lines, one on top of the other as shown in FIG. 15. In the apparatus modification shown in FIG. 15, the liquid interceptor 125 is formed of a series of stacked porous plates 130–135 arranged in spaced relationship to define passages between them and configured at the delivery ends to define ink jet apertures 136–140. In addition to vacuum lines 126 and 127 associated with the upper and lower porous plates 135 and 130, each intermediate plate 131–134 has an associated vacuum line 141–144 connected to one end, or at some other convenient place. All of these vacuum lines lead by way of manifold 145 into the main vacuum line 128. In FIG. 15 a series of feed lines 111–111d are seen stacked on each other. Feed lines 112–116, not shown in FIG. 15, may of course be stacked in similar manner to form a bank of feed lines, each controlled separately or in any combination with one or more of the other lines. Staggering of these feed lines may also be done to attain denser packing of them.

As noted above and as made apparent in FIG. 16, the diversion of the stream droplets may be attained with a wide range of nozzle, and hence jet, diameters. Nozzle diameters may be as small as 5 microns or as large as about 1,000 microns. FIG. 16 shows that the larger the nozzle opening, and hence the larger the droplet diameter, the lower is the frequency required to obtain the desired droplet divergence from the stream axis. The vibration frequencies required are, as shown, dependent upon the diameter of the jet and they may vary between about 100 Hz and $10^6$ Hz. Thus different electromagnetic devices may be use to generate these frequencies. In addition to the piezoelectric crystals and magnetostrictive devices illustrated, magnetically driven vibrating reeds or vibrating coils in a magnetic field may be used, particularly to generate oscillations in the lower frequency ranges. Other types of damping means may also be used, including but not limited to, shortcircuiting devices and electric current pulses in counterphase to the AC current supporting the oscillations.

The following tabulation, calculated from theoretical considerations, affords additional examples of the operation of the apparatus herein described and illustrates the relationship of the operational parameters for one exemplary system:

| Diameter of Jet | Oscillation Amplitude | Jet Velocity | Oscillation Frequency | Distance to Droplet Formation |
|---|---|---|---|---|

| 7μm | 1.2μm | 50m/sec | 0.8MHz | 0.5mm |
| 112μm | 19.2μm | 12.5m/sec | 12.5kHz | 8mm |
| 1.58mm | 0.28mm | 333m/sec | 237Hz | 11.25mm |

Exemplary dimensions, which are meant to be illustrative and not limiting, may be given to illustrate the type of close packing of the feed lines which may be attained in apparatus such as shown in FIGS. 14 and 15. The feed line (ink conduit) may be formed from an 0.1 mm thick glass tube, the inner diameter of which diminishes to 7 microns at the delivery end to form the nozzle. A piezoelectric crystal and electrode (as shown in FIG. 7) having an outside diameter of about 3 mm may be used as the transducer. The aperture in the interceptor, e.g., aperture 136 of FIG. 15 will be dependent upon the distance between the nozzle and the aperture. Typically, if this distance is about 15 mm the aperture can be chosen to be about 0.2mm or more high. Assuming that the sealed porous plates which are used in the interceptor must be about 1 mm thick and that they must be about 1 mm apart, it may be shown that the liquid feed lines may be spaced about 5 mm apart in the vertical direction. They may also be spaced about 5mm in the horizontal plane. Thus in this particular example it is possible to locate about 25 feed lines in a cross sectional area of 1 square centimeter. Other geometries may allow an even higher number of jets per unit area.

Because the jet stream ejected from the nozzle can be converted into two or more clearly defined diverging secondary jets as illustrated in FIG. 2, no background is obtained since all of the unwanted liquid is effectively trapped, a situation which is difficult to realize when the diverted droplets are formed into a spray as is done when electrical or magnetic forces are used to direct them as in U.S. Pat. Nos. 3,416,153 and 3,287,734. Moreover, since the electrical forces are replaced by mechanical forces, no special demands are placed upon the electrical conductivity of the writing fluid or of the aperture.

It will be seen from the above description that the method and apparatus for controlling the flow of droplets in a liquid jet possesses important advantages over the prior art systems employing electrical or magnetic forces. The apparatus is relatively simple, requiring only the control of the intensity and amplitude of relatively low-intensity oscillations. Moreover, the need for switching high voltages is eliminated. This latter advantage is particularly important if combustible liquids such as gasoline are used. In the practice of this invention wide range of nozzle diameters may be used, the lower limit being one dictated by such practical considerations as difficulties of construction and ink plugging. Variations in such operational parameters as jet speed and oscillation amplitude make possible the formation of a desired predetermined pattern of diverging droplet streams from two streams to a multiplicity of them to form a spray-like configuration. Since the interceptor does not have to serve as an electrode its shape and size, as well as the material from which it may be formed, can be widely varied. Finally, a high-density array of individually controlled feed lines may be formed for use, for example, in typewriters or high-speed printers for printing any kind of web material. Closely packed high-speed printing arrays may be made in accordance with this invention to form a matrix of capillaries capable of printing entire alphanumerical characters simultaneously, thus serving for example, as a remote terminal printing device for computers.

It will thus be seen that the object set forth above, among those made apparent from the preceding description, are efficiently attained and, since certain changes may be made in carrying out the above method and in the constructions set forth without departing from the scope of the invention, it is intended that all matter contained in the above description or shown in the accompanying drawings shall be interpreted as illustrative and not in a limiting sense.

We claim:

1. A method for effecting the divergence of liquid droplets formed from a liquid stream ejected under pressure through an aperture, characterized by the step of imparting to said stream prior to droplet formation periodic mechanical oscillations of a frequency and an amplitude which cause said droplets to diverge angularly into at least two separate and distinct streams from the normal axis of said stream, said mechanical oscillations serving as the only force applied to said stream in effecting said divergence.

2. A method in accordance with claim 1 wherein said periodic oscillations are imparted to said stream prior to its ejection through said aperture.

3. A method in accordance with claim 1 wherein said aperture ranges in diameter between about 5 and 1,000 microns and said frequencies range between 100Hz and $10^6$Hz.

4. A method in accordance with claim 1 wherein said oscillations are essentially transverse to the normal axis of said stream.

5. A method in accordance with claim 1 wherein said oscillations are essentially longitudinal along the normal axis of said stream.

6. A method in accordance with claim 1 wherein said oscillations are transverse to and longitudinal along the normal axis of said stream.

7. A method for accurately metering an amount of a liquid, comprising the steps of
   a. ejecting a liquid to be metered through an aperture under pressure thereby to form the liquid into a stream which breaks up to form individual droplets;
   b. imparting periodic mechanical oscillations to said stream prior to droplet formation, the frequency and amplitude of said oscillations being selectively varied between that which will cause divergence of said droplets into at least two separate and distinct streams angularly displaced from the normal axis of said stream and that which will permit said droplets to travel along said normal stream axis; and
   c. separating the liquid thus caused to diverge from said stream axis from that permitted to travel as droplets along said stream axis.

8. A method in accordance with claim 7 wherein said separating comprises directing said liquid caused to diverge from said normal stream axis against porous surface means for removal thereby and directing said droplets traveling along said axis to a receptor.

9. A method in accordance with claim 8 including the step of interposing an apertured interceptor between said aperture through which said liquid is ejected and said receptor.

10. A method in accordance with claim 7 wherein said separating comprises collecting said liquid caused to diverge from said normal stream axis by gravitational force and directing said droplets traveling along said axis to a receptor.

11. A method in accordance with claim 7 including the step of providing an electrical field at or near the point of droplet formation, said field being of a strength and polarity relative to the polarity of said liquid in said stream to enhance but not cause said divergence of said droplets.

12. A method of recording with liquid ink, comprising the steps of
  a. ejecting liquid ink under pressure through an aperture thereby to form said liquid ink into a stream which breaks up to form individual droplets traveling along the axis of said stream;
  b. imparting periodic mechanical oscillations through a transducer to said stream prior to droplet formation;
  c. selectively varying the frequency of said periodic oscillations between that band of frequency at which said droplets will be caused to diverge angularly from travel along said axis into at least two separate and distinct streams and another frequency outside said band which permits said droplets to travel along said axis;
  d. intercepting that portion of said ink thus caused to diverge from travel along said axis; and
  e. directing said droplets traveling along said axis onto the surface of a record member.

13. A method in accordance with claim 12 including the step of varying the amplitude of said oscillations simultaneously with varying said frequency.

14. A method in accordance with claim 12 including the step of moving said record member relative to said axis.

15. A method in accordance with claim 12 wherein said step of selectively varying the frequency of said periodic oscillications comprises transmitting variable signals to said transducer.

16. A method in accordance with claim 15 wherein said signals are transmitted in the form of pulses and including the step of varying the duration of said pulses.

17. A method in accordance with claim 12 including the step of periodically oscillating said liquid ink stream through a predetermined excursion and at essentially right angles to said axis.

18. A method in accordance with claim 12 including the step of adjusting the pressure under which said liquid ink is ejected and the amplitude of said periodic oscillations to obtain a predetermined pattern of droplet divergence.

19. A method in accordance with claim 12 wherein said periodic oscillations are essentially transverse to said axis.

20. A method in accordance with claim 12 wherein said periodic oscillations are essentially longitudinal along said axis.

21. A method in accordance with claim 12 wherein said periodic oscillations are transverse to and longitudinal along said axis.

22. A method in accordance with claim 12 wherein said periodic oscillations are imparted to said stream prior to its ejection through said aperture.

23. A method of recording with liquid ink, comprising the steps of
  a. ejecting liquid ink under pressure through a plurality of apertures thereby to form said liquid into a plurality of separate streams each of which breaks up to form individual droplets traveling along the axes of said streams;
  b. imparting periodic mechanical oscillations through a plurality of transducers to said streams prior to droplet formation;
  c. selectively varying the frequency of said periodic oscillations between that band of frequency at which said droplets in each of said streams will be caused to diverge angularly from travel along said axes into at least two separate and distinct streams and another frequency outside said band which permits said droplets to travel along said axes;
  d. intercepting that portion of said ink thus caused to diverge from travel along said axes; and
  e. directing said droplets traveling along said axes onto the surface of a record member.

24. A method in accordance with claim 23 including the step of varying the amplitude of said oscillations.

25. A method in accordance with claim 23 including the step of periodically oscillating at least selected ones of said liquid ink streams through predetermined excursions and at essentially right angles to said axes.

26. A method in accordance with claim 23 wherein each of said streams is individually controlled by a separate transducer associated therewith.

27. An apparatus for accurately metering an amount of liquid consisting essentially of
  a. a reservoir of liquid;
  b. liquid delivery means terminating in an aperture of a size such that liquid forced therethrough will form a stream which breaks into droplets traveling along an axis;
  c. pump means adapted to transfer said liquid under pressure from said reservoir through said liquid delivery means thereby to form said stream;
  d. transducer means with associated driving means adapted to impart periodic mechanical oscillations to said stream over at least two different frequency ranges, one of said frequency ranges being that which will cause said droplets to travel in at least two different paths which diverge from said axis whereby said transducer means serves as the sole means for controlling the direction of droplet travel;
  e. first means adapted to receive that portion of said liquid travelling in said paths diverging from said axis; and
  f. second means to receive that portion of said liquid travelling along said axis.

28. An apparatus in accordance with claim 27 wherein said driving means is also adapted to control the amplitude of said oscillations.

29. An apparatus in accordance with claim 27 wherein said liquid delivery means is a capillary and said transducer means is mechanically connected thereto.

30. An apparatus in accordance with claim 27 wherein said transducer means comprises a piezoelectric crystal.

31. An apparatus in accordance with claim 27 wherein said transducer means comprises magnetostrictive means.

32. An apparatus in accordance with claim 27 wherein said driving means is adapted to receive and be actuated by electrical signals.

33. An ink jet recording apparatus, comprising in combination
 a. a reservoir of liquid ink;
 b. liquid ink feed line means terminating in a nozzle;
 c. pump means adapted to transfer said liquid ink under pressure from said reservoir through said feed line means and said nozzle at a pressure sufficient to form a liquid ink stream which breaks up into droplets traveling along an axis;
 d. transducer means adapted to impart periodic mechanical oscillations to said stream;
 e. transducer driving means;
 f. means to control said transducer driving means thereby to cause said transducer means to operate over at least two different frequency ranges, one of said frequency ranges being that which will cause said droplets to travel in paths divergent from said axis, whereby said transducer means serves as the sole means for controlling the direction of droplet travel;
 g. ink receptor means; and
 h. interceptor means positioned between said nozzle and said ink receptor means and adapted to intercept that portion of said ink travelling in said divergent paths while permitting that portion of said ink travelling along said axis to reach said ink receptor means.

34. An apparatus in accordance with claim 33 wherein said means to control said transducer driving means comprises pulsed electrical signal generating means.

35. An apparatus in accordance with claim 33 including means to move said ink receptor means relative to said axis.

36. An apparatus in accordance with claim 33 including means to move said liquid ink feed line through predetermined excursions substantially at right angles to said axis.

37. An apparatus in accordance with claim 33 wherein said interceptor means comprises porous surface means and means for withdrawing ink from said porous surface means.

38. An apparatus in accordance with claim 33 wherein said means to control said transducer driving means includes means to also control the amplitude of said oscillations.

39. An apparatus in accordance with claim 33 including means to provide at or near the point of droplet formation an electrical field of a polarity opposite to the polarity of said liquid in said stream, said electrical field being of a strength which will supplement the action of said oscillations in effecting the divergence of said droplets without serving as the sole force for effecting said divergence.

40. An ink jet recording apparatus, comprising in combination
 a. liquid ink reservoir means;
 b. a plurality of liquid ink feed lines terminating in nozzles, said feed lines being maintained in a regular spaced relationship with each other;
 c. pump means adapted to transfer said liquid ink under pressure from said reservoir means through said nozzles at a pressure sufficient to form a plurality of liquid ink streams each of which breaks up into a stream of droplets travelling along its axis;
 d. transducer means adapted to impart periodic mechanical oscillation to said ink streams;
 e. transducer driving and control means adapted to cause said transducer means to operate over at least two different frequency ranges, one of said frequency ranges being that which will cause said droplets to travel in paths divergent from said stream axes, whereby said transducer means serve as the sole means for controlling the direction of droplet travel in each stream;
 f. ink receptor means; and
 g. interceptor means positioned between said nozzles and said ink receptor means and adapted to intercept that portion of said ink travelling in said divergent paths while permitting that portion of said ink travelling along said axes to reach said ink receptor means.

41. An apparatus in accordance with claim 40 wherein separate transducer means and separate transducer driving and control means are associated with each of said liquid ink feed lines.

* * * * *